United States Patent [19]
Fye et al.

[11] Patent Number: 5,432,684
[45] Date of Patent: Jul. 11, 1995

[54] PROCESS FOR MANUFACTURING PAINTED BACKLIT DISPLAYS HAVING UNIFORM BACKLIGHTING INTENSITY

[75] Inventors: Michael E. Fye, Kokomo; William R. Dawson, Fischers, both of Ind.

[73] Assignee: Delco Electronics Corp., Kokomo, Ind.

[21] Appl. No.: 180,152

[22] Filed: Jan. 11, 1994

[51] Int. Cl.$^6$ ............................................. G01D 11/28
[52] U.S. Cl. ........................................ 362/30; 362/85; 40/541; 356/432
[58] Field of Search ............... 356/213, 218, 219, 221, 356/239, 432, 433; 40/541, 552, 579; 362/24, 26, 27, 29, 30, 88, 85, 812

[56] References Cited
U.S. PATENT DOCUMENTS

| | | | |
|---|---|---|---|
| 2,032,895 | 3/1936 | Slutsky | 40/552 |
| 3,694,945 | 10/1972 | Detiker | 40/133 R |
| 3,841,762 | 10/1974 | Pettersson | 356/432 |
| 4,729,067 | 3/1988 | Ohe | 362/26 |
| 4,891,896 | 1/1990 | Boren | 40/541 |
| 4,977,695 | 12/1990 | Armbruster | 40/541 |
| 5,066,132 | 11/1991 | Nagata et al. | 356/239 |
| 5,095,409 | 3/1992 | Dematteo et al. | 362/23 |
| 5,235,400 | 8/1993 | Terasawa et al. | 356/239 |

*Primary Examiner*—Ira S. Lazarus
*Assistant Examiner*—Alan B. Cariaso
*Attorney, Agent, or Firm*—Jimmy L. Funke

[57] ABSTRACT

A method is provided for producing an illuminated graphic display composed of non-flat molded plastic backlit components which serve as interior controls for an instrument panel of an automobile. The method involves a process by which such backlit components are manufactured so as to result in minimal variability of backlighting intensity. The method particularly involves molding each backlit component from a white translucent substrate whose thickness is individually tailored such that the backlit component exhibits a suitable level of backlighting intensity when illuminated by a minimal number of light sources. For daytime viewing, a suitable and uniform level of graphics whiteness for the group of backlit components is achieved by painting each substrate with a white translucent coating, such that the backlit components have similar reflective characteristics.

20 Claims, 1 Drawing Sheet

PROCESS FOR MANUFACTURING PAINTED BACKLIT DISPLAYS HAVING UNIFORM BACKLIGHTING INTENSITY

The present invention generally relates to illuminated graphic displays and buttons used on the instrument panel of an automobile. More particularly, this invention relates to a process by which non-flat molded plastic backlit displays can be manufactured so as to result in minimal variability of backlighting intensity.

BACKGROUND OF THE INVENTION

Illuminated graphic displays and buttons for automotive applications such as radios often have backlit insignia which identify the particular function of the display or button. Such backlit components have a light source which is positioned behind the insignia in order to make the insignia visible in the dark, necessitating that the insignia be capable of transmitting light from the light source. However, backlit components must also be visible in daylight, necessitating that the insignia also be capable of reflecting light available within the passenger compartment.

A known process for manufacturing buttons and other backlit components is the use of paint and laser technology. These processes have generally involved the use of a transparent plastic substrate which is painted white to form a white translucent layer over the transparent substrate, and then painted black to form an opaque black covering over the white translucent layer. The black covering is then lased away to expose a portion of the white translucent layer, which serves as the insignia. The transparent nature of the substrate maximizes the transmission of light through the backlit component for night time viewing, while the white translucent layer contributes graphics whiteness by reflecting light, such that the insignia can be visible under natural lighting conditions during daylight hours. As used herein, the term "graphics whiteness" is employed in accordance with industry standards to quantitatively and qualitatively describe the level of light reflected by a surface. A standard known in the art and employed herein for evaluating graphics whiteness is the color space Y value per the international standard 1931 CIE (Commission International de l'Eclairage).

A variation of the above structure is disclosed in U.S. Pat. No. 4,729,067 to Ohe. Ohe teaches the use of a transparent substrate over which is essentially deposited a translucent layer and a light diffusing layer. The transparent substrate is an acrylic resin, while the light diffusing layer is preferably composed of an acrylic resin matrix in which is dispersed a light diffusing agent. The translucent layer serves to bond the light diffusing layer to the transparent substrate, and enhance the diffusion of the light transmitted through the substrate into the light diffusing layer. However, the layers are delineated by chemically reacted surfaces, making the utilization of the teachings of Ohe rather complicated and expensive for mass production.

Another variation of the more conventional structure described earlier is disclosed in U.S. Pat. No. 3,694,945 to Detiker. Detiker teaches the use of a white translucent substrate over which is formed an opaque grating composed of an opaque reflective layer and a covering layer. The translucent substrate is formed from silicate glass or a polymer, such as an acrylic resin or polycarbonate, while the reflective layer is composed of metal or an acrylic resin lacquer in which a metal is dispersed. The covering layer may be of any suitably translucent material, such as a lacquer. The reflective layer serves to prevent light emitted from a light source beneath the substrate from reaching the covering layer, and then reflects the light back toward the substrate. Consequently, light emitted by the light source escapes only through openings in the grate. In essence, backlighting of a display formed in accordance with Detiker is transmitted through a translucent substrate, and not a transparent substrate and translucent layer. However, generating a grate in accordance with Detiker is relatively expensive and limits the use of such techniques to relatively large displays.

The paint and laser process described earlier also has significant shortcomings. Insignias typically used in automobile graphic displays have a stroke width (the line width of the insignia) of only about 0.5 millimeter. Obtaining suitable optical characteristics with such intricate graphics requires very tight control of the cured thickness of the white paint in order to maintain the desired reflectance and transmissive properties. Often, as a result of the limitations of paint processes and paint chemistry, the thickness of the white paint must be maintained between about 20 and about 30 micrometers in order to achieve suitable lighting intensities for daytime and nighttime viewing. However, the variation in thickness between backlit components within a display group must be maintained within a ±2.5 micrometer range in order to provide a uniform lighting appearance.

Furthermore, different backlighting intensities of adjacent insignia result in irregular illumination intensities within the display group. This is particularly true with buttons of a backlit display which share one or more light sources. To minimize costs, such groupings often use a minimum number of light sources, and incorporate light pipes for the purpose of distributing the light energy equally to each of the backlit components. Though much effort has been directed toward optimizing the capability of light pipes, uniform backlighting of each and every backlit component is very difficult due to size and location restraints. As a result, facets and painted patterns have often been applied to light pipes in order to increase the light intensity directed to relatively dim areas. In particular, reflectors and additional lamps have been required, while excessively bright areas have been attenuated with printed halftone patterns behind the individual insignia.

While such tactics have been effective for flat screen printed displays, it is very costly and poorly suited for buttons and other backlit components which are not flat and have low lighting intensities. Generally, from a production standpoint, it is most cost effective if all the buttons for a given display group are molded in a single mold and subsequently finished as a set. Deviations from this approach typically have not been cost effective or practical. An example is the use of different shades of white paint on buttons within a single display group. Other approaches, such as molding each button from a white translucent substrate whose thickness is specifically tailored to achieve acceptable backlighting intensities, have resulted in unacceptable graphics whiteness of the insignia under natural lighting conditions. In addition, molding the substrate of adjacent buttons from materials with different light transmission characteristics is not feasible in a production environment.

From the above, it can be seen that the prior art lacks a method by which differing light transmission and reflection characteristics can be suitably provided for backlit components in order to equalize their backlighting intensities and reflectivities. Accordingly, it would be desirable if a process existed by which a group of non-flat molded plastic backlit components could be manufactured with minimal variability in backlighting intensity. Such a method would allow each backlit component to be individually tailored to exhibit a suitable level of backlighting intensity when backlit by a minimal number of light sources. Furthermore, such a method would produce backlit components whose reflection characteristics under daylight conditions also yielded a suitable and uniform level of graphics whiteness.

SUMMARY OF THE INVENTION

It is an object of this invention to provide a method by which a group of non-flat molded plastic backlit components are produced with minimal variability in backlighting intensity.

It is a further object of this invention to provide a method in which each backlit component is molded from a white translucent substrate whose thickness is individually tailored to exhibit a suitable level of light intensity when backlit by a minimal number of light sources.

It is another object of this invention to provide a method in which each backlit component is painted with a white translucent coating so as to have similar reflection characteristics under natural light conditions, such that the components within the group exhibit a suitable and uniform level of graphics whiteness for viewing in daylight.

It is yet another object of this invention to provide a method in which the addition of a white translucent layer over a white translucent substrate causes substantially no decrease in light transmission through the substrate, but serves primarily to increase the daytime graphics whiteness and enhance the light dispersement characteristics of the backlit components.

In accordance with a preferred embodiment of this invention, these and other objects and advantages are accomplished as follows.

According to the present invention, there is provided a method for producing an illuminated graphic display for use in an instrument panel of an automobile. In particular, the method involves a process by which non-flat molded plastic backlit components within a display group are manufactured so as to result in minimal variability of backlighting intensity. The method involves molding each backlit component from a white translucent substrate whose thickness is individually tailored to exhibit a suitable level of lighting intensity when backlit by a minimal number of light sources. For daytime viewing, a suitable and uniform level of graphics whiteness for a group of backlit components is enabled by painting each substrate with a white translucent coating such that the backlit components have similar reflection characteristics.

Generally, each backlit component of a display group produced in accordance with this invention includes a white translucent substrate, a white translucent layer disposed on a surface of the substrate, and an opaque layer covering a portion of the white translucent layer, such that a portion of the white translucent layer which is exposed by the opaque layer defines an insignia for the backlit component. One or more light sources direct light through the substrate and the white translucent layer of each backlit component. In accordance with this invention, the thickness of the white translucent substrate is specifically tailored so as to control the backlighting intensity of the backlit component, such that the backlit components within the display group have substantially equal backlighting intensities.

To achieve suitable backlighting characteristics, it is preferable that the white translucent substrate be formed from a polymeric material having light transmission ranging from about 15 to about 50 percent, while the white translucent layer is a paint material having light transmission ranging from about 10 to about 50 percent. The thickness of the white translucent substrate is preferably as much as about 3 millimeters, while the thickness of the white translucent layer is preferably about 15 to about 35 micrometers. In accordance with this invention, the thickness of the white translucent substrate is tailored such that its corresponding backlit component exhibits a desired level of backlighting intensity when it and the other components within the group are backlit by a minimal number of light sources. Furthermore, the reflective characteristics of the white translucent layer enable each of the backlit components to exhibit a suitable and uniform level of graphics whiteness under daylight conditions. Unexpectedly, the inclusion of the white translucent layer over the white translucent substrate does not cause a significant decrease in the backlighting intensity of a backlit component, but serves primarily to increase the daytime graphics whiteness and enhance the light dispersement characteristics of a backlit component. As a result, a backlit component formed in accordance with this invention can exhibit a graphics whiteness of about 30 percent or more and light transmission ranging from about 5 to about 25 percent.

The method by which a group of backlit components can be manufactured in accordance with this invention involves a prototype stage in which each backlit component is similarly formed. The backlighting characteristics of the backlit components are then evaluated in order to determine how each backlit component can be appropriately and individually tailored, such that the entire display exhibits uniform illumination at an appropriate level. Production tooling can then be appropriately developed for the backlit components.

During the prototype stage, each backlit component is formed to include a white translucent substrate which is molded from a suitable polymeric material to have a predetermined thickness. A white translucent layer is then deposited on an outer surface of the substrate, and an opaque layer is applied which covers the white translucent layer. A portion of the opaque layer is then removed so as to define an insignia with the exposed portion of the white translucent layer. The backlit components are then arranged within an enclosure which includes a light source that duplicates that which will be used in the production display panel. The backlighting intensity transmitted from the light source through the white translucent substrate and the white translucent layer is then measured for each of the backlit components. Thereafter, an appropriate thickness for the substrate for each of the backlit components can then be determined which will achieve substantially equal backlighting intensities for the backlit components. Production manufacturing of the backlit components can than be commenced based on the optimal thicknesses identified during the prototype stage.

Using the method of this invention, a display panel of backlit components will exhibit substantially equal backlighting intensities due to each backlit component being formed from a white translucent substrate whose thicknesses has been tailored in accordance with the prototype process. Contrary to prior art attempts in which backlit components have been molded from a white translucent substrate whose thickness is tailored to achieve acceptable backlighting intensities, the method of this invention further includes a white translucent layer over a white translucent substrate. As a result, the backlit components exhibit an acceptable graphics whiteness under daylight conditions, which is in contrast to the unacceptable variations in graphics whiteness seen with the prior art described above. A specific and unexpected feature of this invention is that the white translucent layer does not cause a significant decrease in backlighting intensity. Consequently, the backlighting intensity of a backlit component manufactured in accordance with this invention is determined primarily by the light source, the light transmission characteristics of the substrate, and the placement of the light source relative to the substrate.

Furthermore, the method of this invention avoids approaches suggested in the prior art which have found to be impractical and/or not cost effective, such as the use of various shades of white paint, and molding the substrate of each backlit component from materials with different light transmission characteristics. As a result, all the backlit components within a display group can be molded with a single mold and subsequently finished as a set.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings wherein.

DETAILED DESCRIPTION OF THE INVENTION

Figure 1:
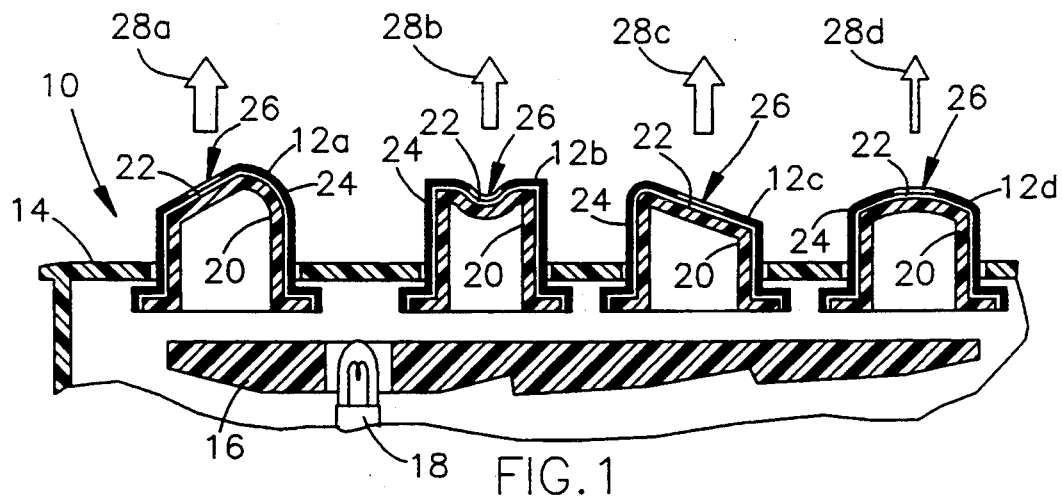
FIG. 1 shows in cross-section a backlit display panel composed of several backlit buttons as arranged and formed for a prototype stage in accordance with a preferred method of this invention.
Figure 2:
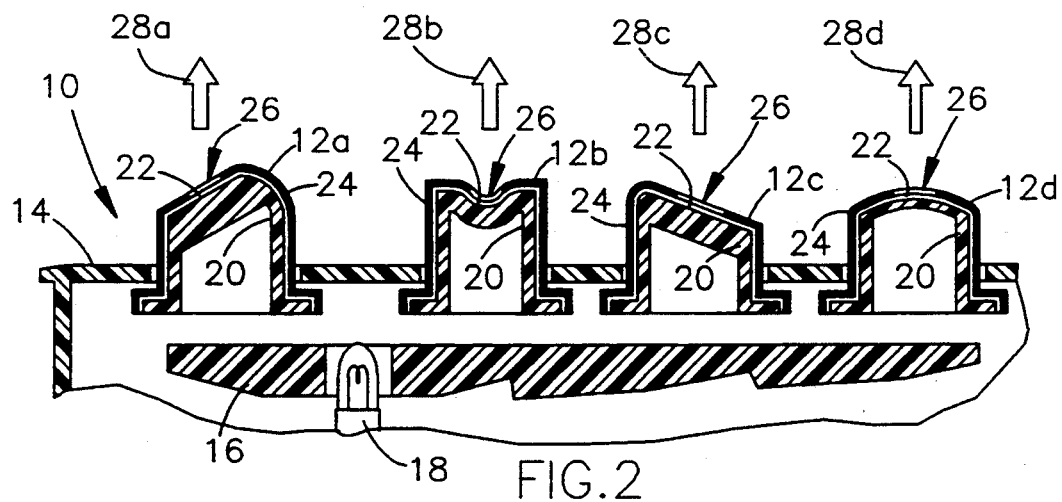
FIG. 2 is a cross-sectional view of the backlit display panel after the thicknesses of the substrates of the individual buttons have been appropriately adjusted to achieve substantially uniform backlighting intensities for the display panel in accordance with the method of this invention.

With reference to FIGS. 1 and 2, the method of this invention is directed toward illuminated graphic displays 10 composed of non-flat molded plastic backlit components, such as buttons 12a through 12d, which serve as interior controls for an instrument panel of an automobile. The method entails a process by which such backlit components 12a through 12d can be manufactured so as to result in minimal variability of backlighting intensity between the individual backlit components 12a through 12d of the graphic display 10, while simultaneously achieving an acceptable graphics whiteness level for daylight viewing.

For illustrative purposes, the graphic display 10 is shown in FIGS. 1 and 2 as being composed of a single display panel 14 within which four backlit buttons 12a through 12d, are housed. As shown, a single light source 18 is housed within a light pipe 16, for the purpose of promoting the distribution of light from the light source 18 to each of the buttons 12a through 12d in the graphic display 10. Those skilled in the art will recognize that the above representation is merely one example of numerous possible arrangements, in which one or more backlit components are illuminated by one or more light sources, optionally in cooperation with one or more light pipes of any one of numerous designs and configurations. In that the specific characteristics of the light source 18 and light pipe 16 illustrated in FIGS. 1 and 2 are not a feature of this invention, and the numerous possible variations in their design are generally within the knowledge and skill of those skilled in the art, they will not be discussed in further detail below.

The buttons 12a through 12d are shown as having a structure in accordance with a preferred aspect of this invention. Each button 12a through 12d includes a white translucent substrate 20, a white translucent layer 22 formed over the substrate 20, and an opaque cover layer 24 which overlays the translucent layer 22. Portions of the translucent layer 22 are exposed by openings in the opaque layer 24 so as to define an insignia 26 on the surface of each of the buttons 12a through 12d. With this arrangement, the light emitted by the light source 18 is distributed by the light pipe 16 and transmitted through the substrate 20 and the white translucent layer 22, such that the insignia 26 is clearly visible by an observer for night viewing. As will be explained in greater detail below, the exposed white translucent layer 22 has reflective characteristics which promote the visibility of each insignia 26 during daylight viewing.

The substrate 20 is preferably formed from a polymeric material, such as an acrylic resin or a polycarbonate resin in which white pigmentation is dispersed, though other suitable materials could foreseeably be used. For purposes of this invention, a preferred material for the substrate 20 must be white and translucent, having light transmission ranging from about 15 to about 50 percent and a graphics whiteness of about 30 to about 80 percent at a nominal thickness of about 0.5 to about 2 millimeters. Particularly suitable materials have been found to be polycarbonate resins identified as White Lexan 141 S-20983, S-20984, S-20985, S-20986 and S-20987, and available from RTP, of Winona, Minn. The preferred polycarbonate resin has light transmission ranging from about 30 to about 35 percent and a graphics whiteness of about 40 to about 50 percent at a nominal thickness of about 0.75 to about 1.5 millimeters. It is foreseeable that other suitable materials could be used, such as an acrylic, styrene-acrylonitrile (SAN), white acrylonitrile-butadiene-styrene (ABS), or another suitable non-opaque thermoplastic or thermoset that can be pigmented white.

The translucent layer 22 can be any suitable coating material which exhibits the required light transmission characteristics for purposes of this invention. In particular, the material for the translucent layer 22 must be compatible with and adherable to the substrate 20, as well as being white and translucent. Preferably, the material has light transmission ranging from about 10 to about 50 percent and a graphics whiteness of about 30 to about 70 at a nominal thickness of about 15 to about 35 micrometers. A particularly suitable material has been found to be a water-reducible paint identified as White 318LE19493 (Texture "C"), and available from Red Spot Paint Company, of Evansville, Ind. The preferred paint has light transmission ranging from about 30 to about 40 percent and a graphics whiteness of about 60 to about 70 at a nominal thickness of about 15 to about 35 micrometers. As such, a backlit component composed of the preferred white translucent layer 22 over the preferred substrate 20 will preferably have a graphics whiteness of at least about 30 percent and light transmission ranging from about 5 to about 25 percent, after being painted and lased to form a suitable insignia 26 having an approximately 0.5 millimeter stroke width. In addition, the preferred paint has been found to be compatible with paint application equipment used in mass production. However, it is foreseeable that other suitable materials could be used in place of the preferred paint, as long as similar whiteness versus light transmission characteristics are present, the material will adhere to the substrate 20, and the material will not discolor from the laser process. Potentially suitable materials include acrylic lacquers, two-component urethanes, and water-reducible acrylic-urethanes.

Finally, suitable materials for the opaque layer 24 must be capable of providing correct opacity, gloss and color at a nominal thickness of about 25 micrometers. A preferred material for the opaque layer 24 has been found to be a black urethane paint, such as Black 318LE19495, also available from Red Spot Paint Company. In addition, it is anticipated that water-reducible black paints will perform well for purposes of this invention.

As will be described in greater detail below, the thickness of the substrate 20 determines to a significant degree the illumination of the insignia 26 at the surface of the buttons 12a through 12d. In the prior art, the thickness of a white translucent layer over a transparent substrate, similar to that taught by Ohe, has been particularly critical, in that slight variations in thickness of the white translucent layer, on the order of five micrometers, can have a visibly adverse effect on the perceptible graphics whiteness of a component's insignia. However, in accordance with this invention, it has been discovered that the combination of the white translucent substrate 20 with the white translucent layer 22 minimizes the effect which the thickness of the white translucent layer 22 has on the graphics whiteness of the buttons 12a through 12d. Furthermore, it has been determined that the effect which the white translucent layer 22 has on backlighting intensity is minimal as long as the paint material from which the white translucent layer 22 is formed is within typical white pigment concentrations for translucency. As a result, relatively high backlighting intensities can be achieved with the white translucent substrate/layer combination of this invention.

Figure 3:
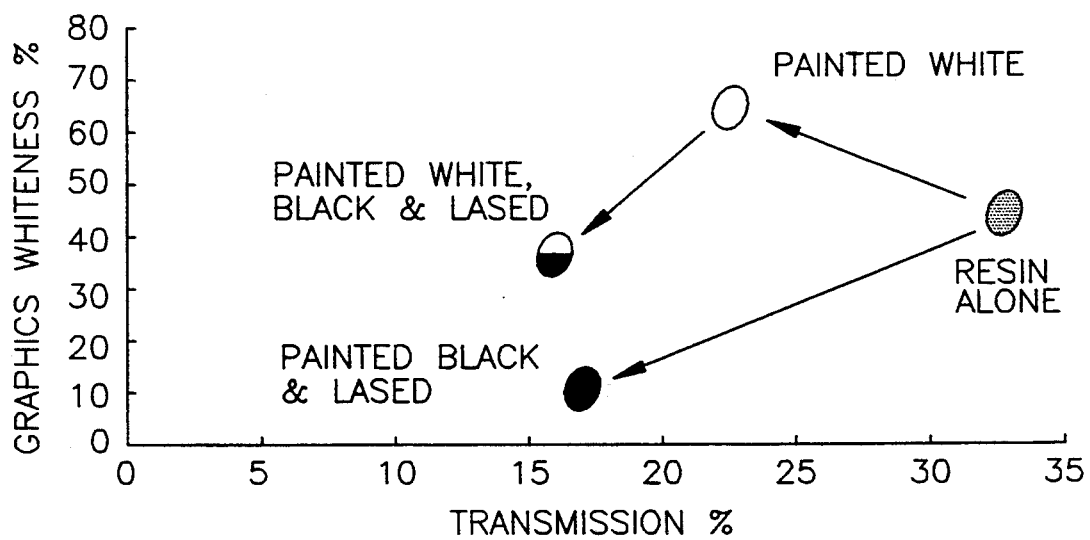
FIG. 3 is a graph which illustrates the effect which a white translucent coating applied to the surface of a white translucent substrate has on the light transmission and graphics whiteness characteristics of a backlit component formed in accordance with the method of this invention.

The above noted relationship can be seen with reference to FIG. 3. The datum identified as "Resin Alone" represents the approximate light transmission characteristics for a backlit component molded from an approximately 1.0 millimeter thick white translucent substrate of the preferred S-20983 polycarbonate resin. The datum identified as "Painted Black and Lased" represents the substrate after being painted with an approximately 25 micrometers thick layer of the preferred black paint, which has been lased to form an insignia on the surface of the substrate having a stroke width of about 0.5 millimeter. Such a structure is generally in accordance with the teachings of Detiker. As would be expected, the transmittance of the backlit component drops because a significant portion of the transmitted light is blocked by the black paint. However, a substantial reduction in the graphics whiteness of the backlit component under natural lighting conditions has also occurred.

The datum identified as "Painted White" represents a substantially identical substrate on which an approximately 25 micrometers thick layer of the preferred white translucent paint of this invention has been deposited. As would be expected, the transmittance of the backlit component drops because a portion of the transmitted light is scattered and absorbed by the white translucent paint. However, quite unexpectedly, a significant increase in the graphics whiteness of the backlit component under natural lighting conditions has also occurred. Finally, the datum identified as "Painted White, Black and Lased" represents the substrate after being painted with the same opaque black paint used above, and then lased to form a substantially identical insignia having a stroke width of about 0.5 millimeter. As again would be expected, the transmittance of the backlit component has dropped because an additional portion of the transmitted light has been blocked by the opaque black paint. However, the graphics whiteness of the backlit component under natural lighting conditions has remained relatively high, and considerably higher than that of the substrate not provided with the white translucent layer.

Accordingly, the above representation indicates that suitable graphics whiteness of a backlit component can be achieved by painting a white translucent substrate with a white translucent paint. In accordance with this invention, it has been found that this capability is substantially retained even though the thickness of the substrate is varied. Therefore, the backlighting intensity of a backlit component can be selectively altered in part by varying the thickness of the substrate, while suitable graphics whiteness of the backlit component can be achieved by appropriately controlling the thickness of the white translucent paint.

The preferred method by which the backlighting intensity of the buttons 12a through 12d is controlled in accordance with this invention involves a prototype stage, represented by FIGS. 1 and 2. The prototype stage is utilized to evaluate relative backlighting intensities of the buttons 12a through 12d when formed at a nominal condition, from which the thicknesses of their respective substrates 20 can be altered to achieve a desired backlighting level. The substrate 20 of each of the buttons 12a through 12d is preferably formed to have a nominal thickness, such as about 0.6 to about 1 millimeter. As illustrated, the substrates 20 are each of approximately the same thickness, though this is not necessary.

In addition, each button 12a through 12d is processed essentially identically, with the thicknesses of the white translucent layer 22 and the opaque layer 24 being roughly the same for each button. Preferably, the thicknesses of the white translucent layer 22 and the opaque layer 22 are each held to about 20 to about 30 micrometers. An insignia 26 is then formed in each of the opaque layers 22 in a conventional manner, such as with an approximately 0.1 millimeter diameter near-infrared laser beam which makes several passes in rapid succession across the surface of each button 12a through 12d in order to vaporize a portion of their opaque layers 22. The resulting insignia 26 will typically have a stroke width of about 0.5 millimeter, as is conventional for automotive graphic displays, though the preferred stroke width may differ for some applications. The above laser technique is well known in the art and will not be discussed further. In addition, other techniques for forming the insignia 26 could also be adopted by those skilled in the art.

The buttons 12a through 12d are then arranged within the display panel 14, which includes the light source 18 and the light pipe 16. The display panel 14, light source 18 and light pipe 16 are each configured so as to duplicate the conditions of a display panel which will be used in production. The backlighting intensities, represented by the arrows 28a through 28d, generated by light transmitted from the light source 18 through the substrates 20 and the white translucent layers 22 are then measured for each of the buttons 12a through 12d. Different backlighting intensities are represented by the different scaled sizes of the arrows 28a through 28d. For example, the backlighting intensity of the button 12a is represented as being significantly greater than that for the button 12d, as a result of the button 12a being closer to the light source 18.

From the above technique, optimal thicknesses for the substrates 20 can be analytically or experimentally determined in order to achieve substantially equal backlighting intensities for subsequent sets of otherwise identically molded buttons 12a through 12d, as represented in FIG. 2. Specifically, the thickness of the substrate 20 for each of the buttons 12a through 12d of FIG. 2 has been appropriately decreased or increased by altering the molds in which their respective substrates 20 are formed. As an illustrative example, the thickness of the substrate 20 of button 12a shown in FIG. 2 has been significantly increased, while the thickness of the substrate 20 of button 12d has been significantly decreased in order to equalize their backlighting intensities 28a and 28d. When utilizing the preferred material for the substrate 20, thicknesses of up to about 3 millimeters can be achieved using conventional molding practices. It is foreseeable that greater thicknesses could be achieved using enhanced molding techniques or where button geometry allows.

Accordingly, molds for each of the buttons 12a through 12d within the display panel 14 can be appropriately adapted to produce buttons 12a through 12d which exhibit substantially equal backlighting intensities. Production tooling for the buttons 12a through 12d is therefore based on the optimal substrate thicknesses identified during the prototype stage. Once appropriately sized, molding of the buttons 12a through 12d can proceed in a substantially conventional manner.

From the above, it can be seen that a significant advantage of this invention is that the buttons 12a through 12d for a display panel can be mass produced to exhibit substantially equal backlighting intensities, due to each button 12a through 12d being formed from a white translucent substrate 20 whose thickness has been tailored in accordance with the process of this invention. Furthermore, a button manufactured in accordance with the method of this invention is composed of a white translucent layer 22 deposited over a white translucent substrate 20, such that the button exhibits an acceptable graphics whiteness level under natural lighting conditions. While the ability to affect light transmission through a translucent material by altering its thickness is known, such an approach has resulted in unacceptable variations in graphics whiteness for backlit components. However, the addition of the white translucent layer 22 of this invention has been determined to have an advantageous effect on graphics whiteness for backlit components, without causing an unacceptable decrease in light transmission. Consequently, the method of this invention seeks to regulate the backlighting intensity of backlit components by selectively adjusting the thickness of the substrate 20 for each backlit component within a display panel 14 which shares a common light source or light sources.

Accordingly, the method of this invention is capable of alleviating the processing disadvantages encountered with the teachings of the prior art. For example, approaches which utilize various shades of white paint to form a white translucent layer over a transparent substrate, or molding the substrates of backlit components from materials having different light transmission characteristics, are completely unnecessary. The present invention overcomes such drawbacks by enabling the manufacture of a group of backlit components for a single display panel using the same materials in substantially identical molding and finishing operations.

While our invention has been described in terms of a preferred embodiment, it is apparent that other forms could be adopted by one skilled in the art, for example by adopting processing methods other than those suggested here, or by substituting appropriate materials. Accordingly, the scope of our invention is to be limited only by the following claims.

The embodiments of the invention in which an exclusive property or privilege is claimed are defined as follows:

1. A method for producing backlit components having substantially uniform backlighting intensities, said method comprising the steps of:
forming a plurality of said backlit components such that each of said backlit components comprises a white translucent substrate, a white translucent layer disposed on a surface of said white translucent substrate, and an opaque layer covering a portion of said white translucent layer so as to define an insignia with an exposed portion of said white translucent layer, wherein said forming step includes:
individually tailoring the thickness of said white translucent substrate of each of said plurality of backlit components so as to achieve a uniform backlighting intensity of each said insignia as produced by light transmission through said white translucent substrate and then said white translucent layer from a light source; and
providing said white translucent layer so as to promote the reflective intensity of each said insignia.

2. A method as recited in claim 1 wherein said forming step includes forming said white translucent substrate from a polymeric material having light transmission ranging from about 15 to about 50 percent at a nominal thickness of about 0.5 to about 2 millimeters.

3. A method as recited in claim 1 wherein said forming step includes forming said white translucent layer from a paint material having light transmission ranging from about 10 to about 50 percent at a nominal thickness of about 15 to about 35 micrometers.

4. A method as recited in claim 1 wherein said forming step includes forming said white translucent substrate to have a thickness of up to about 3 millimeters.

5. A method as recited in claim 1 wherein said forming step includes forming said white translucent layer to have a thickness of about 15 to about 35 micrometers.

6. A method as recited in claim 1 wherein said forming step includes removing a portion of said opaque layer so as to expose said exposed portion of said white translucent layer and thereby define said insignia.

7. A method for producing backlit components having substantially uniform backlighting intensities and graphics whiteness, said method comprising the steps of:

forming a plurality of said backlit components such that each of said backlit components comprises a molded white translucent substrate, a white translucent layer disposed on a surface of said white translucent substrate, and an opaque layer covering a portion of said white translucent layer so as to define an insignia with an exposed portion of said white translucent layer, wherein said forming step includes:

individually tailoring the thickness of said white translucent substrate of each of said plurality of backlit components so as to achieve a uniform backlighting intensity of each said insignia as produced by light transmission through said white translucent substrate and then said white translucent layer from a light source; and controlling the thickness of said white translucent layer so as to promote the reflective intensity of each said insignia such that said backlit components have substantially equal graphics whiteness.

8. A method as recited in claim 7 wherein said forming step includes forming said white translucent substrate from a polymeric material having light transmission ranging from about 15 to about 50 percent at a nominal thickness of about 0.5 to about 2 millimeters.

9. A method as recited in claim 7 wherein said forming step includes forming said white translucent layer from a paint material having light transmission ranging from about 10 to about 50 percent at a nominal thickness of about 15 to about 35 micrometers.

10. A method as recited in claim 7 wherein said forming step includes forming said white translucent substrate to have a thickness of up to about 3 millimeters.

11. A method as recited in claim 7 wherein said forming step includes lasing a portion of said opaque layer so as to expose said exposed portion of said white translucent layer and thereby define said insignia.

12. A method as recited in claim 7 wherein said forming step includes forming said backlit components to have a graphics whiteness of at least about 30 percent and light transmission ranging from about 5 to about 25 percent.

13. A method for producing backlit components having substantially uniform backlighting intensities and graphics whiteness, said method comprising the steps of:

molding a plurality of said backlit components such that each of said backlit components comprises a white translucent substrate, a white translucent layer disposed on a surface of said white translucent substrate, and an opaque layer covering a portion of said white translucent layer so as to define an insignia with an exposed portion of said white translucent layer, said white translucent layer promoting the reflective intensity of said insignia such that said backlit components have substantially equal graphics whiteness, said white translucent substrate having a substantially uniform thickness for each of said backlit components;

arranging said backlit components within an enclosure having a light source disposed therein;

measuring light intensity transmitted through said white translucent substrate and said white translucent layer from said light source for each of said backlit components; and adjusting the thickness of said white translucent substrate for each of said backlit components so as to substantially equalize the light intensity transmitted through said white translucent substrate and said white translucent layer from said light source, such that said backlit components have substantially equal backlighting intensities;

whereby said backlit components have substantially equal backlighting intensities due to said white translucent substrates having thicknesses in accordance with said adjusting step, and wherein said backlit components have substantially equal graphics whiteness due to each of said backlit components having said white translucent layer deposited on said white translucent substrate.

14. A method as recited in claim 13 wherein said forming step includes forming said white translucent substrate from a polymeric material having light transmission ranging about 15 to about 50 percent at a nominal thickness of about 0.5 to about 2 millimeters.

15. A method as recited in claim 13 wherein said forming step includes forming said white translucent layer from a paint material having light transmission ranging from about 10 to about 50 percent at a nominal thickness of about 15 to about 35 micrometers.

16. A method as recited in claim 13 wherein said forming step includes forming said white translucent substrate to have a thickness of about 0.6 to about 1 millimeter.

17. A method as recited in claim 13 wherein said adjusting step includes forming said white translucent substrate to have a thickness of up to about 3 millimeters.

18. A method as recited in claim 13 wherein said forming step includes lasing a portion of said opaque layer so as to expose said exposed portion of said white translucent layer and thereby define said insignia.

19. A method as recited in claim 13 wherein said forming step includes forming said backlit components to gave a graphics whiteness of at least about 30 percent and light transmission ranging from about 5 to about 25 percent.

20. A method as recited in claim 13 wherein said forming step includes forming said white translucent substrate from a polycarbonate resin.

* * * * *